Aug. 18, 1931.  E. A. JOHNSTON  1,819,605
HARVESTER
Filed Nov. 24, 1928  3 Sheets-Sheet 1
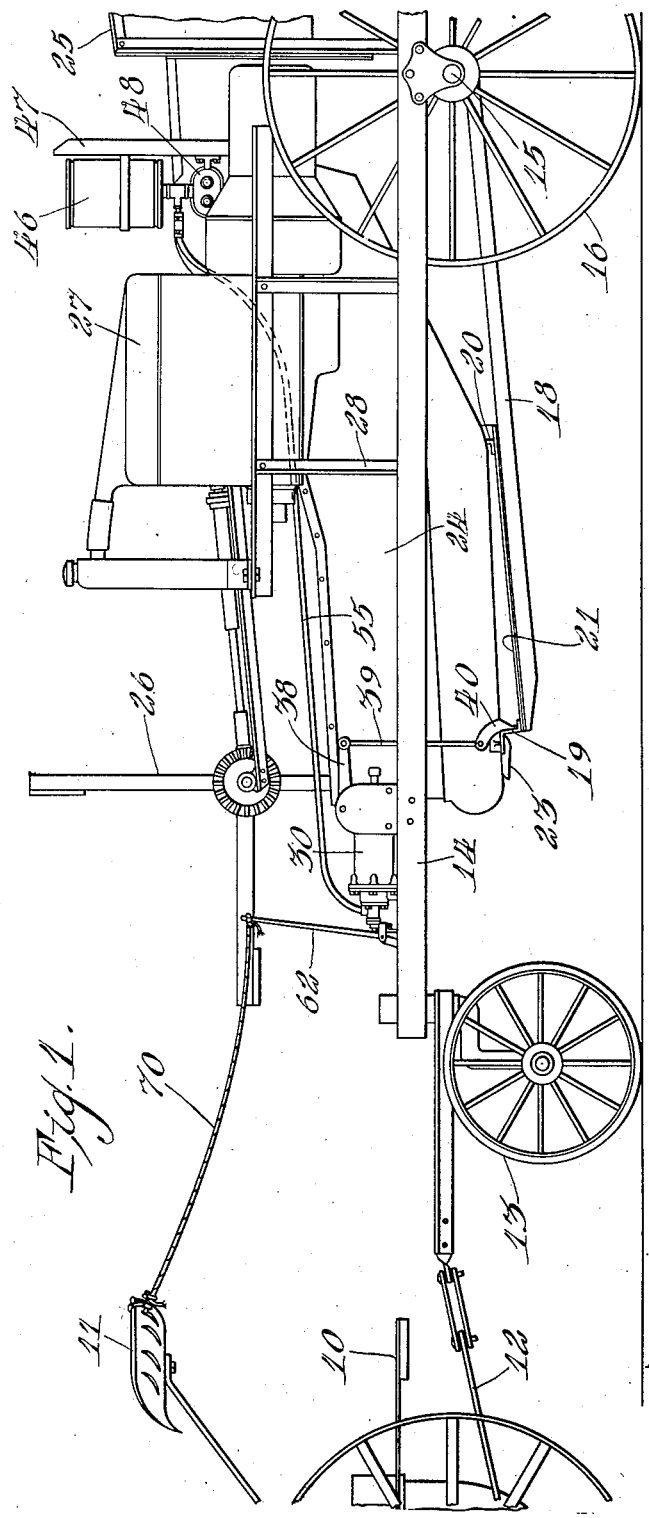
Inventor.
Edward A. Johnston
By [signature]
Atty.

Aug. 18, 1931.  E. A. JOHNSTON  1,819,605
HARVESTER
Filed Nov. 24, 1928  3 Sheets-Sheet 2
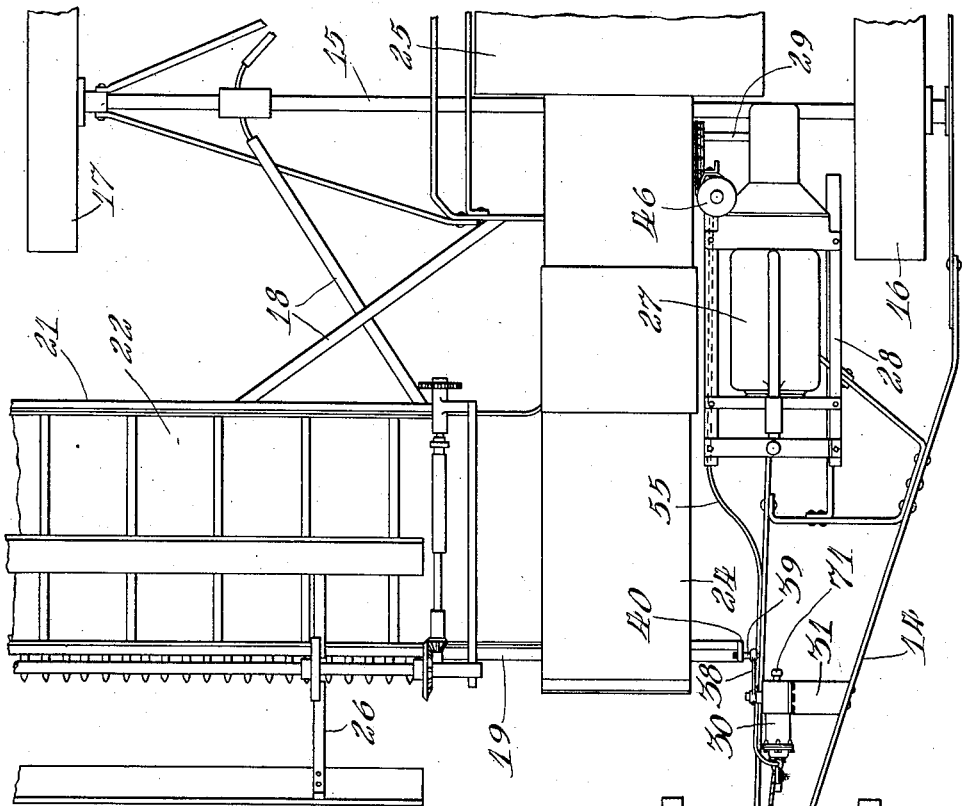
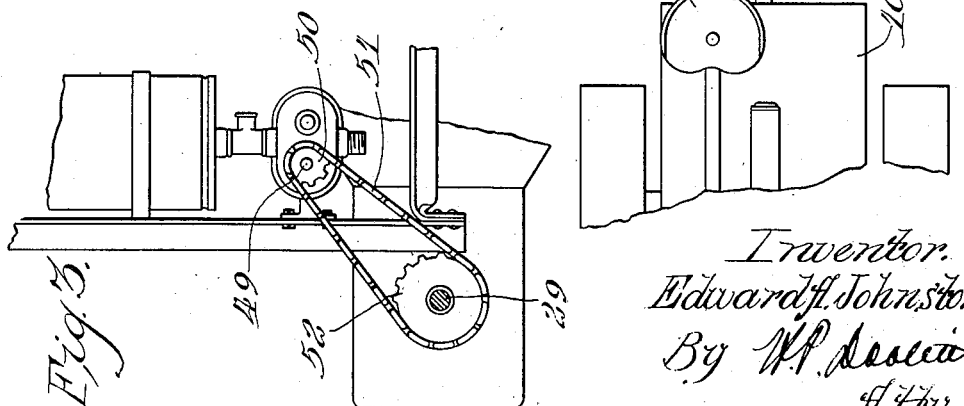
Inventor.
Edward A. Johnston

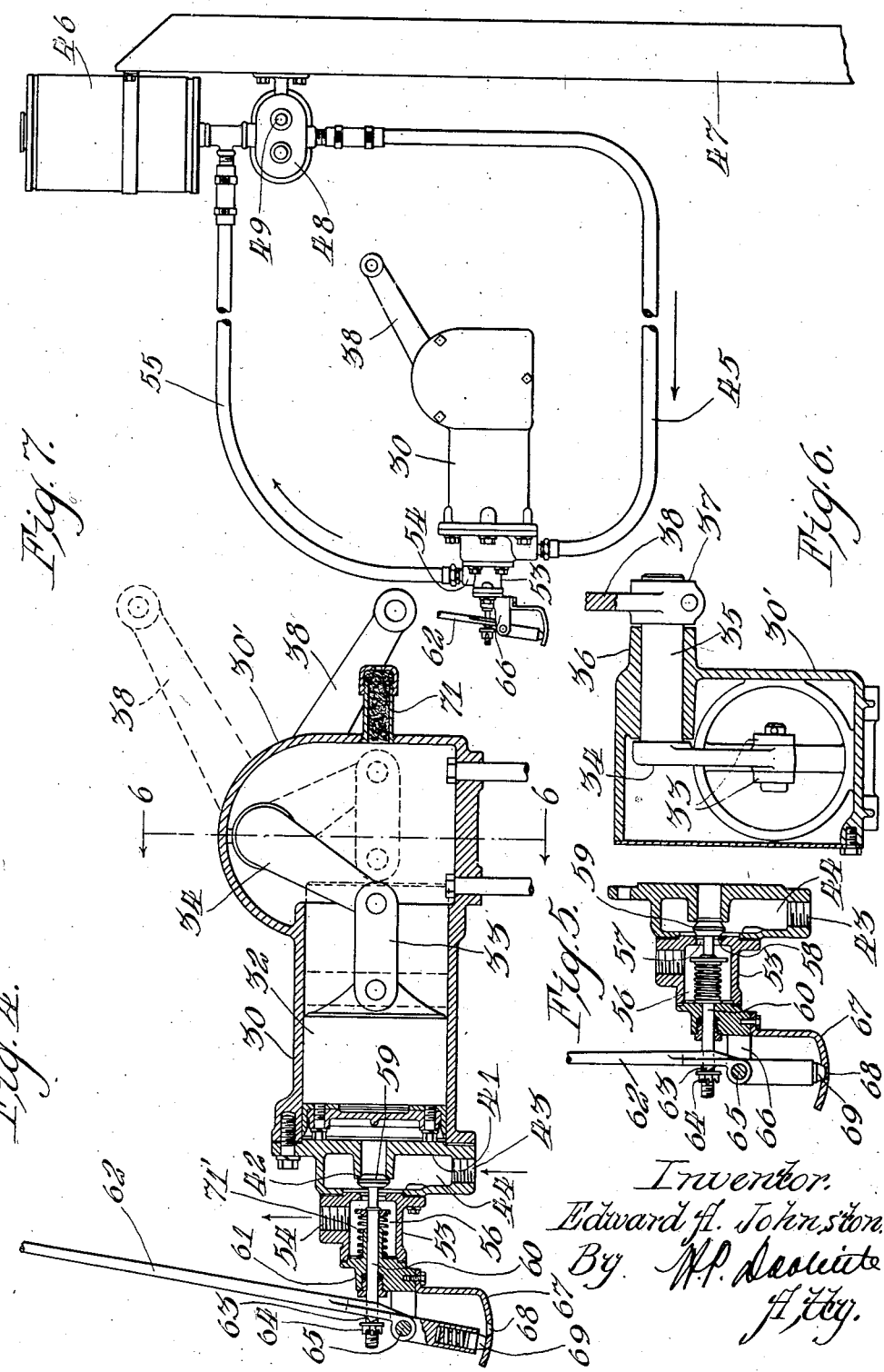

Patented Aug. 18, 1931

1,819,605

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

HARVESTER

Application filed November 24, 1928. Serial No. 321,616.

The invention relates to harvesters.

In machines of this kind, such for example as harvester threshers, headers, and tractor binders, which employ large and heavy harvester platforms, it has always been a problem to provide an efficient, easily operable adjusting mechanism for raising or lowering these platforms as the machine travels through the field. Such platform adjustment, as is well known in this art, is necessary so as to accommodate the cutting mechanism of the harvester, which is usually carried by the platform, to varying heights of grain encountered to regulate the cut of the grain. In this connection, the present practice which is quite standardized, is to utilize a long lever mechanism, which is hand controlled by the operator, to effect this adjustment. As these platforms are heavy, as has been stated, it is required that the lever be very long to get the best possible leverage to make the adjustment as easy as possible. Such long levers at best are awkward and require the operator to use considerable muscular energy in operating the same.

It would, therefore, be highly desirable and advantageous to provide a lift mechanism for the purposes stated which would eliminate the use of these long levers and the incidental employment of so much energy on the part of the operator.

Accordingly, it is the object of this invention to provide a hydraulic or fluid operated mechanism for effecting the adjustment of these platforms, such mechanism involving a trip lever actuated by a pull rope requiring little effort on the part of the operator, such hydraulic means then acting automatically to effect the adjustment of the platform.

Another object of this invention is to provide such fluid or hydraulic control means which will be entirely enclosed to prevent ingress of dirt and which will be small and compact and be easily applicable to harvesters as now constructed, as a substitute arrangement for the awkward lever mechanisms now employed.

Other and incidental objects will become apparent to those skilled in this art as the disclosure continues.

Briefly, these desirable objects are accomplished in the provision of a casing to be located on any suitable part of the frame of the harvester, which casing includes a movable element that has connection with levers which in turn are connected to the usual lift element connected to the forward corner of the platform of the harvester. By means of a valve mechanism controlled at will by a pull rope from the seat of the tractor which draws the harvester, the operator can regulate the flow of fluid, which is under pressure, from any suitable source arranged on the machine, to cause the movable element in the casing to be actuated by fluid pressure to effect the platform adjustments, as will later more fully appear.

In the accompanying sheets of drawings, an illustrative example of the invention has been shown in connection with a harvester thresher, where it is desired to adjust the platform. Obviously the fluid control mechanism of this invention may be easily adapted to other adjustment functions of a harvesting machine. For example, to a grain binder, where this fluid control can be utilized to effect the shift of the binder mechanism; to effect the tilt of the platform; and, to effect the up and down and fore and aft adjustment of the reel. These facts are merely mentioned to illustrate further the adaptability of the fluid control means of this invention to other purposes in machines of this class. In these drawings,—

Figure 1 is a general side elevational view of a harvester thresher construction, the rear end of the tractor being shown to illustrate how the control may be conveniently actuated by the operator from his seat on the tractor;

Figure 2 is a plan view of the structure shown in Figure 1;

Figure 3 is a detail, side elevational view to illustrate how pressure may be built up in the fluid line;

Figure 4 is a general vertical, sectional view through the casing which encloses the fluid operated adjusting mechanism;

Figure 5 is a detail view showing another position of the valve mechanism which controls the flow of the fluid;

Figure 6 is an end vertical, sectional view of the structure as seen along the line 6—6, looking in the direction of the arrows in Figure 4; and, Figure 7 is a general layout view showing the assembled fluid control means.

As has been stated, the illustrative embodiment of the invention will be shown in connection with a tractor drawn harvester thresher, where it is desired to effect up and down adjustment of the platform of this machine. Therefore, referring to Figures 1 and 2, a tractor has been shown at 10 which is provided with an operator's seat 11, the tractor also having a drawbar 12 to which is connected a tongue truck 13. The tongue truck carries the front end of a harvester thresher main frame 14. The rear end of the frame 14 is carried in a main, transverse harvester thresher axle 15, which is journaled in a main wheel 16 and a grain wheel 17, all as is usual in standard machines of this kind. At the stubbleward end of the machine are arranged the usual crossed line bars 18 which carry at their front ends the usual Z-bar 19, and, spaced rearwardly thereof, the usual angle bar 20. The platform 21 is arranged on this Z-bar and this angle bar. A transversely running conveyor 22 is conventionally carried on the platform 21, and at its front edge the Z-bar 19 carries the usual cutting mechanism indicated at 23. The conveyor 22, as is usual in this art, conveys cut material into a feeder housing 24, which is arranged adjacent the main frame 14 and has its front end resting on the Z-bar 19, as best shown in Figures 1 and 2, the feeder housing 24 functioning in the usual manner to direct the cut material into a thresher part 25 carried on the main frame. A reel structure, which co-operates with the cutting mechanism 23, is indicated in the drawings at 26.

It is the usual practice at the present time to provide an engine on the main frame, which drives the operative parts of the thresher part and harvester part. In this disclosure, such engine is indicated at 27, the same being arranged on a super-frame structure 28 carried on the main frame 14. It is enough for this disclosure to say that the engine 27 drives a transversely arranged counter-shaft 29, which shaft may, within the feeder structure 24, carry and drive a beater, or any other rotatable element, not shown.

It is desired to effect up and down adjustment of the platform 21 with the least effort on the part of the operator and it is advantageous to accomplish such adjustment from the operator's station 11 on the tractor 10. This invention, as has already been indicated, purposes to provide a hydraulic or fluid controlled means functioning at the will of the operator and designed as a substitute arrangement for the usual awkward lever arrangement to make this adjustment of the platform. This mechanism will now be described.

Accordingly, a casing 30 is mounted on a cross support 31, or in any other appropriate manner on the frame 14 of the machine. This casing encloses for sliding movement a member 32, which may be a piston that has connection with a link 33 (see Figure 4), which link in turn is pivotally connected to the lower end of a crank 34 which is connected with a transverse crank shaft part 35 rockingly journaled in a bearing 36 formed in an enlarged casing extension 30'. The crank shaft part 35 protrudes laterally out of the casing 30', as shown in Figure 6, and there carries, by means of a pinch bind 37, a lever arm 38. The purpose of the pinch bind 37 is to permit the arm or lever 38 to be adjustably set at any desired angle with respect to the shaft 35. The end of the arm 38, as best shown in Figure 1, has pivotally connected thereto at its free end a depending pull link 39 that is connected to an arm 40 made fast to the Z-bar 19. Obviously now, it can be seen that, if the arm 38 is raised, the platform 21 will be pulled up, and, if the arm 38 is lowered, the platform will be lowered.

Of course, it is the piston element 32 that causes movement of the arm 38, and in accordance with this invention it is hydrostatic pressure through a fluid medium that causes movement of the piston 32. It can now be understood that the casing 30 is really a cylinder having a cylinder head 41 provided centrally with a valve seat 42 and a fluid inlet nipple 43, the fluid entering a chamber 44 formed within the head 41 from an inlet pipe 45 that leads to a source of fluid supply in the form of a reservoir 46 carried in any appropriate manner on an upright frame support 47. A conventional form of gear pump 48 is interposed in the fluid line 45 to force the liquid through the line into the chamber 44 under pressure.

As shown in Figure 3, a shaft 49 extending from the gear pump carries a sprocket wheel 50 driven from a chain 51, that receives power from a sprocket wheel 52 carried on the shaft 29 heretofore described.

Connected to the cylinder head part 41 is an auxiliary fitting 52, as best shown in Figures 4 and 5, which fitting has an outlet nipple 54 that receives an outlet pipe 55 for returning liquid to a point, as shown in Figure 7, where it can be recirculated by the pump 48. The fitting 53 has a chamber 56 that is in communication, by means of a valve opening 57, with the first mentioned chamber 44. A valve seat 58 is provided in the fitting 53 in line with the valve seat 42. A double headed valve 59 is carried on a valve stem 60, which valve stem is slidable in a bearing 61 by means of a lever or trip arm 62 that has a fulcrum 63 rockable on an adjustable stop 64 carried on the valve stem, the lever being pivoted on a pin 65 carried in a support 66. A lock element 67 having an opening 68 is connected to the part 61, as shown, said part 67 serving as a guide for the lower end of the trip or lever arm 62 beneath its pivot 65. As shown in Figure 4, the lower end of this lever carries a conventional form of spring pressed plunger 69 which rides on the part 67. The double valve 59 is locked in an intermediate position between the two valve seats 42 and 58 when the spring pressed plunger 69 is yieldingly locked in the opening 68, as shown in Figure 5. In such position of the valve 59, the fluid is freely circulated through the chamber 44 and the chamber 56 to the return flow conduit 55, and thus, because of the weight of the platform 21 exerting a down pull on the arm 38, the piston 32 is caused to slide to the left, as shown in Figure 4. If the lever arm 62 is moved to cause the valve 59 to be seated on the seat 58, then the fluid pressure builds up in the chamber 44 and passes the valve seat 42 into the cylinder 30 to cause movement of the piston 32 to the right, as shown in Figure 4, which means that the arm 38 will be raised, and consequently the platform will be raised. If the lever arm 62 is moved in the opposite direction, causing the valve 59 to be seated on the seat 42, then the liquid which has moved the piston 32 is held against return flow and a pressure is maintained, which locks the piston 32 in position to hold the platform in any desired, vertically set position, as will be obvious.

The lever 62 has tied to it a pull rope 70, which will be made fast to the seat 11 of the tractor, or in any position contiguous thereto, so as to be readily accessible to the operator on this seat. Any air pressures which might exert a back force and that for any reason might be built up within the housing 30' are exhausted through the air bleeder nozzle 71.

In the operation of the machine, let us assume that the parts are in the position shown in Figure 4 with the arm 38 and the piston 32 in the extreme left hand position, as shown in this figure. This means that the platform 21 is in its extreme lower position. For the sake of illustration, we will assume that the operator on the tractor 10 and seated on his seat 11 desires to cause vertical adjustment of the platform 21. Therefore, the piston 32 will have to be moved to the right, so that the arm 38 will be raised. Accordingly, the operator pulls the rope 70 so as to seat the valve 59 on the seat 58 to close off the chamber 56 and to unseat the valve from the seat 42. As the fluid coming from the supply source 46 is always under mechanical pressure through the line 45, due to the working of the pump 48 which operates continuously, a fluid pressure is built up against the head of the piston 32, causing the same to move to the right, resulting in raising of the lever 38, which pulls the link 39 and raises the platform 21. When the platform has reached the desired vertical height, the operator releases the rope 70 and a spring 71' then comes into play to re-seat the valve 59 on the seat 42, thus preventing return flow of the liquid and causing the built up pressure on the piston 32 to be maintained, with the result that the platform remains in a set position.

Let us assume now that it is desired to lower the platform. The operator then pulls the rope 70 to cause the lever 62 to assume the position shown in Figure 5 with the valve 59 in an intermediate position between its two seats, which then will permit the fluid to circulate freely from the inlet to the outlet, and the fluid within the casing 30 is then forced out therefrom by the piston 32 because of the weight of the platform. The platform will then continue to move down as long as the valve 59 is in an intermediate position between its seats. Down movement of the platform is immediately stopped when the operator releases the rope 70, for then the spring 71 again comes into play to seat the valve on the seat 42.

From this detailed description, it must now be apparent that a simple yet effective, hydraulically actuated means has been provided for effecting adjustment of a harvester part, such for example as the platform in a harvester thresher, and that the invention achieves all of the desirable objects heretofore recited.

It is the intention to cover all such changes and modifications as do not materially depart from the spirit and scope of the invention as hereinafter claimed.

What is claimed is:

1. In a harvester having a main frame, an adjustable harvester element, hydraulically moved means on the frame, actuating means operated thereby and connected to the element for adjusting the same, and operator controlled means for governing the operation of the hydraulic means.

2. In a harvester having a main frame, an adjustable harvester platform, hydraulically moved means on the frame, actuating means operated thereby and connected to the platform for adjusting the same, and operator controlled valve means for regulating the operation of the hydraulic means.

3. In a harvester having a main frame, a harvester platform, fluid moved means on the frame, actuating means operated thereby and connected to the platform for adjusting the same, means for maintaining the fluid under constant pressure, and valve means for controlling the operation of the fluid means.

4. In a harvester, a main frame, an adjustable grain engaging element, a casing on the frame enclosing a reciprocable piston, a source of fluid supply, an inlet and outlet connection from the casing to the source of fluid supply, a pump for circulating the fluid under pressure, valve mechanism for controlling the flow of fluid including means for stopping or reversing movement of the piston at any point in its stroke, operator controlled means for actuating the valve mechanism, and means connecting the grain engaging element and piston to adjust the element.

5. In a harvester, a main frame, an adjustable mower platform, a casing on the frame enclosing a reciprocable piston, a source of fluid supply, an inlet and outlet connection from the casing to the source of fluid supply, a pump for circulating the fluid under pressure, spring pressed valve mechanism for normally isolating the casing and piston from the flow of fluid, distant control means for actuating the valve mechanism against the spring pressure to cause the fluid to move the piston, and means connecting the mower platform to the piston to adjust the platform.

6. A harvester having a frame and an adjustable element, a casing on the frame enclosing a movable piston, valve controlled fluid means for moving the piston, a crank within the casing operated by the piston, said crank including a shaft extension projecting without the casing, a lever connected to said shaft extension, and means connecting said lever to the element.

7. A harvester having a frame and a movable platform, a casing on the frame enclosing a movable piston, valve controlled fluid means for moving the piston, a crank within the casing operated by the piston, said crank including a shaft extension projecting without the casing, a lever adjustably connected to said shaft extension, and means connecting said lever to the platform.

8. A harvesting machine comprising the combination of a grain engaging element movable within a fixed range for adjustment, motor operated means comprising a hydraulically actuated piston having connections for adjusting the element, and means for starting or stopping the movement of the piston at will to move or hold the movable element stationary at any point within the range of movement of said element.

9. A harvesting machine comprising the combination of a grain engaging element movable within a fixed range for adjustment, a supporting frame therefor, a fluid operated motor on the frame and connected to said element, means for supplying fluid under pressure to said motor, and means comprising a manually actuated control valve for stopping or starting said motor at any point within the range of movement of said element.

10. A tractor propelled harvester comprising the combination of a main frame adapted for connection to a tractor, a grain engaging element supported on the frame and movable within a fixed range for adjustment, motor operated means on the frame for adjusting said element, and means for starting or stopping the motor operated means at any point within the range of movement of said element including control means operable from an operator's station on a tractor.

11. A tractor propelled harvester comprising the combination of a main frame adapted for connection to a tractor, a grain engaging element supported on the frame and movable within a fixed range for adjustment on a hydraulically operated motor on the frame connected to said element for adjusting the same, means for supplying fluid under pressure to said motor, means controlling the flow of fluid to said motor including a valve operable to start or stop the motor at any point within the range of adjustment of said grain engaging element, and means for controlling the valve from an operator's station on a tractor.

12. In a harvester thresher comprising the combination of a thresher part and an adjustable harvester part, a first motor for driving operative parts of the thresher and harvester parts, a second motor for adjusting the harvester part, means for transmitting power from the first to the second motor, and means for controlling at will the operation of said second motor.

13. In a harvester thresher comprising the combination of a thresher part and an adjustable harvester part, a first motor for driving operative parts of the thresher and harvester parts, a fluid motor for adjusting the harvester part, means for transmitting power from the first to the fluid motor, and operator controlled means for starting and stopping said fluid motor at will.

14. In a tractor propelled harvester thresher comprising the combination of a thresher part and an adjustable harvester part, a first motor for driving operative parts of the thresher and harvester parts, a second motor for adjusting the harvester part, means for transmitting power from the first to the second motor, and distant control means for controlling at will the operation of said second motor from an operator's station on the tractor.

15. In a tractor propelled harvester thresher comprising the combination of a thresher part and an adjustable harvester part, a first motor for driving operative parts of the thresher and harvester parts, a fluid motor including manually actuated control valves for starting and stopping said fluid motor, means for transmitting power from the first to the fluid motor, and distant control means for the valves for controlling at will the operation of said fluid motor from an operator's station on the tractor.

In testimony whereof I affix my signature.

EDWARD A. JOHNSTON.